United States Patent

Mandeville et al.

[11] 4,003,006
[45] Jan. 11, 1977

[54] PILOT TONE CONTROLLED ADAPTIVE AMPLITUDE EQUALIZER

[75] Inventors: Gordon James Mandeville, Lawrence, Mass.; Dale Irving McLean, Hampstead, N.H.

[73] Assignee: Bell Telephone Laboratories, Incorporated, Murray Hill, N.J.

[22] Filed: Oct. 6, 1975

[21] Appl. No.: 619,674

[52] U.S. Cl. .................................. 333/16; 325/62; 333/18
[51] Int. Cl.² ......................................... H04B 3/10
[58] Field of Search ................. 333/16, 18; 325/42, 325/65, 62

[56] References Cited
UNITED STATES PATENTS

| | | | |
|---|---|---|---|
| 2,054,657 | 9/1936 | Mayer | 333/16 |
| 2,607,851 | 8/1952 | Pfleger | 333/16 |
| 2,719,270 | 9/1955 | Ketchledge | 333/16 |
| 3,573,667 | 4/1971 | Kao et al. | 333/18 |
| 3,758,881 | 9/1973 | Rummler | 333/16 |
| 3,763,359 | 10/1973 | Cho et al. | 333/18 X |

OTHER PUBLICATIONS

Babler, G. M., "A Study of Frequency Selective Fading etc.," BSTJ, vol. 51, Mar. 1972, pp. 731–757.
Angell, E. H., L5 System: Repeatered Line, BSTJ, vol. 51, Mar. 1972, pp. 1935–1985.

*Primary Examiner*—Paul L. Gensler
*Attorney, Agent, or Firm*—Bryan W. Sheffield

[57] ABSTRACT

An adaptive equalizer to compensate for the effects of frequency-selective fading on a microwave radio system. The equalizer includes two Bode-type bump networks and an AGC amplifier whose slope and gain are respectively controlled by pilot tones added to the message load. Importantly, the frequency characteristics of the two Bode networks are non-overlapping, thus ensuring stability.

11 Claims, 6 Drawing Figures

PILOT TONE CONTROLLED ADAPTIVE AMPLITUDE EQUALIZER

BACKGROUND OF THE INVENTION a. Field of the Invention

Broadly speaking, this invention relates to equalization. More particularly, in a preferred embodiment, this invention relates to methods and apparatus for adaptively amplitude equalizing a communications channel which is subject to frequency-selective fading.

b. Discussion of the Prior Art

As is well known, microwave radio channels frequently experience deep fading in rain or fog. Service is maintained over such channels by providing sufficient power at the transmitter to ensure an adequate signal-to-noise ratio at the receiver even in the presence of a deep fade, and by providing the receiver with automatic gain control.

In addition to fades caused by rain or fog, it has been discovered that unusual atmospheric conditions may support microwave propagation over two or more distinct paths between any two, line-of-sight radio antennas in the microwave system. The various signal paths typically differ in their propagation delay, thus permitting both constructive and destructive interference at the receiving antenna. When the relative delay is significant with respect to the period of the radio frequency signal, the interference can be quite selective, with deep nulls in parts of the band and smaller variations at adjacent frequencies.

The variation in the received power is called fading, and the variation in fading as a function of frequency is known as selective fading. During non-selective fading, for example during heavy fog, the signal level across the microwave channel remains flat and simply drops in level. When the channel is experiencing selective fading, however, the channel characteristic contains one or more minima which can be quite sharp. The most important features of a selective fade are its depth and the variation of the response across the channel. The depth of a typical selective fade may be as much as 40 dB while the rate at which the fade occurs may be as high as 100 dB/second.

Heretofore, virtually all microwave systems employed frequency modulation, which is relatively insensitive to both selective and non-selective fading. Recently, however, there has been considerable interest expressed in converting existing F.M. systems to the use of amplitude modulation, particularly suppressed-carrier, single-sideband modulation. In many respects amplitude modulation promises to be more efficient than frequency modulation; unfortunately, it is far more sensitive to the effects of frequency-selective fading than is frequency modulation.

The problem of selective fading has, of course, been known at lower frequencies for many years. For example, U.S. Pat. No. 2,054,657, which issued Sept. 15, 1936 to H. Mayer, discusses a circuit which may be used to compensate for the effects of selective fading in a short-wave radio receiver. In the circuit discussed by Mayer, the frequency band to be regulated is divided into a number of sub-bands, each of which is separately regulated, for example, by means of a pilot tone transmitted within each of the sub-bands. For satisfactory regulation, it is necessary that the sub-bands be closely spaced, i.e., that they overlap, and this is typical of prior art "multi-bump" amplitude equalizers.

U.S. Pat. No. 2,719,270, which issued Sept. 27, 1955 to R. W. Ketchledge, discloses a somewhat more sophisticated equalizer for use with coaxial cable carrier systems. In the Ketchledge patent, three, tandem-connected adjustable equalizers having overlapping but differently shaped frequency characteristics are controlled by three pilot tones respectively transmitted at the edges and center of the message band. After passage through the equalizer, the pilot tones are filtered from the message band, amplified, detected, and compared with a reference voltage. An analogue computer connected to the three comparison circuits then determines the changes which must be made to the shapes of the three bump equalizers to effect the desired overall equalizer adjustment.

Each of the three pilot tone feedback circuits in the Ketchledge equalizer contains amplification. This fact, plus the fact that the equalizer sections have overlapping frequency characteristics, lays open the possibility of instability and oscillation in the equalizer. This does not, in fact, occur in the Ketchledge equalizer because it is designed for use in a coaxial cable system where changes in attenuation occur slowly and are of limited amplitude. Thus, the bandwidth of the pilot tone filters and the gain around the three feedback loops can be selected such that the equalizer is stable at all times.

Unfortunately, the circuit disclosed in the Ketchledge patent is not capable of compensating for frequency-selective fading in a microwave system because of the extremely rapid rate at which such fading takes place, as well as its relatively large magnitude. To satisfactorily equalize for frequency-selective fading in the microwave region, it is necessary that the equalizer contain both a considerable amount of negative feedback and wide bandwidth so that it may respond to the rapid changes in signal level. Thus, the simple approach proposed by Mayer and Ketchledge would, in the presence of such feedback, cause oscillations and instability, thus rendering the equalizer inoperative.

The problem of providing adaptive amplitude equalization in a microwave channel subjected to extremely rapid frequency-selective fading has been solved by the instant invention which, in a preferred embodiment, comprises apparatus for adaptively equalizing the amplitude of a communications channel which has impressed thereon a message load of predetermined bandwidth, first and second pilot tones respectively positioned proximate the upper and lower edges of the band and at least a third pilot tone positioned proximate the center of the band. More particularly, the apparatus comprises, in tandem, means for shaping the frequency characteristic of a first portion of the band and means for shaping the frequency characteristic of a second portion of the band, the first and second shaping means being designed such that they have substantially no shaping effect on that portion of the band shaped by the other. The equalizer also includes a variable-gain amplifier connected downstream of the first and second shaping means, means connected to the output of the amplifier for filtering the first, second and third pilot tones from the message load and means connected to the output of the filtering means for detecting the first, second and third pilot tones. The apparatus also includes a source of reference potential and means connected to the reference source and to the detecting means for selectively adjusting the gain of the variable gain amplifier and/or the slope characteristics of the first and second shaping means, in an offsetting manner, as the levels of the first, second and third tones vary, whereby the overall amplitude characteristic of the communications channel remains substantially flat even in the presence of frequency-selective and non-frequency-selective fading in the channel.

The invention and its mode of operation will be more fully understood from the following detailed description when taken with the appended drawings in which:

DETAILED DESCRIPTION OF THE INVENTION

The invention will now be described with reference to a particular microwave system, for example, the microwave system known to the industry as TD-2. As is well known, this system operates in the 4 GHz common carrier band with and IF frequency of 70 MHz. One skilled in the art will appreciate, however, that the invention is not so limited; indeed, in its broader aspects, the invention is applicable to other communication systems, for example, satellite communication systems, HF and VHF radio systems and, under certain circumstances, to land-line systems such as those operating under coaxial or millimeter waveguides.

As previously mentioned, the present invention arose out of research directed towards the conversion of existing microwave systems from frequency modulation to suppressed carrier, single sideband amplitude modulation. These single sideband systems are intended for use with voice, voiceband data, data-under voice (DUV) and possibly wideband data. It has been calculated that to accommodate this wide variety of signals on a 20 MHz SSB channel operating at an IF frequency of 70 MHz, the maximum allowable amplitude deviation during fading is ±2 dB, with a maximum phase deviation of ±20 degrees. In addition, in order that the noise performace of the sytem not be degraded, any adaptive equalizer employed should have a noise figure of less than 14.5 dB and a third order intermodulation coefficient, $M_{A+B-C}$, of less than −63 dB. Of the several equalizer configurations which might be used for this purpose, we have found that the power series equalizer is preferred and should be more than adequate to equalize voice, voiceband data, and data-under voice.

At the present time, the phase lag of a selective fade is not completely understood; thus, it is unclear whether or not additional phase equalization will be required to equalize more complex data signals. Accordingly, the present equalizer does not address this problem.

As will be more fully explained below, the novel equalizer disclosed and claimed herein contains an AGC circuit for frequency independent equalization and two variable bump equalizers centered at each end of the channel. It can be shown that the use of only two bump equalizers can match either a linear shape or a quadratic shape. Therefore, the equalizer according to the invention can successfully approximate the first three terms of a power series.

In order to equalize a faded microwave channel with a polynominal equalizer to within ±2 dB, it has been determined that the dynamic range of the linear term must be ±18.5 dB and the dynamic range of the quadratic term must be ±7 dB. This would require the equalizer to have two equalizer networks each having ±9.25 dB of dynamic range for the linear term and ±7 dB of dynamic range for the quadratic term, or a total of ±16.25 dB of dynamic range. However, an analysis of a two-path fade model, which approximates actual fading data measured in experiments conducted on a working microwave system, leads to the conclusion that for channels which are faded less than 40 dB, large amounts of quadratic and linear shaping are not simultaneously required. This is highly significant because it means that the bump equalizer networks are actually only required to provide ±9.25 dB of dynamic range.

Summarizing the above, the equalizer according to this invention (excluding the AGC circuitry) must conform to the following specifications:

| | | |
|---|---|---|
| Total Nominal Gain | = 0 | dB |
| Noise Figure | < 14.5 | dB |
| $M_{A+B-C}$ | < −63 | dB |
| Dynamic Range of Each Bump | > ± 9.25 | dB |

As previously discussed, microwave radio channels exhibit the phenomenon of both selective and non-selective fading caused by atmospheric effects. Selective fading, in particular, is the result of the reception of multiple signals which have undergone different time delays in transmission. It has been found that a two-path fade model closely approximates a large number of observed channel characteristics and is therefore most useful in designing a parctical equalizer. Such a model channel has the transfer function $$H(f) = l - re^{-j2\pi(f-f_0)\tau} \quad (1)$$

where 20 log $(l-r)$ is the fade depth in dB, $f_0$ is the frequency of the fade minimum, and $\tau$ is the delay difference between the two propagation paths.

In particular, a two-path fade with a fade depth of 20 dB, a time delay of 4 nanoseconds and all possible frequencies of fade minimum $(f_0)$, adequately matches the amplitude characteristics of the worst fades that would have to be equalized to meet the outage objectives of a typical system. That is, an equalizer which can equalize a 20 dB, 4 nanosecond fade for all positions of the fade minimum $(f_0)$ will meet system specifications. Therefore, the 20 dB, 4 nanosecond fade was used as a standard test fade for the design of the equalizer disclosed herein.

As previously indicated, the Bode-bump approximation to a second order polynomial equalizer is a simple and powerful form of equalization. The particular equalizer configuration disclosed and claimed herein, that is, two Bode-bump equalizers for shaping and one AGC unit for level control, was used to equalize the 20 dB, 4 nanosecond test fade in the 60 – 80 MHz I.F. band. After first order improvement to take advantage of the actual Bode network characteristics, the optimum bump parameters were found to be:

| Low Frequency Bump | High Frequency Bump |
|---|---|
| $f_o = 61$ MHz | $f_o = 79$ MHz |
| $K = 4.0979$ | $K = 4.6001$ | where $f_o$ is a frequency at which the continually variable bump has its maximum or minimum amplitude and K is a stiffness factor related to the width of the bump on the frequency axis.

Figure 1:
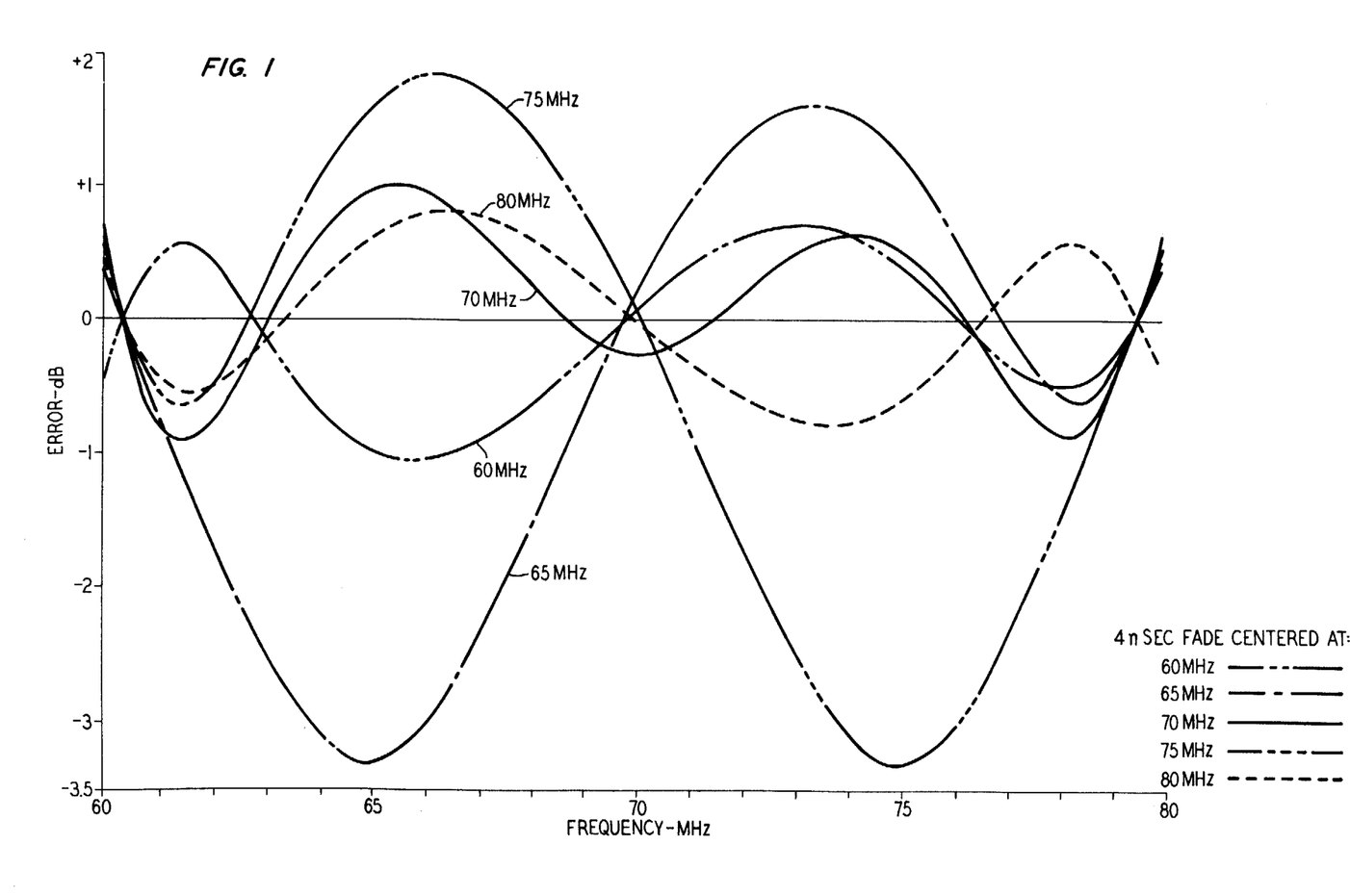
FIG. 1 is a graph showing the transmission characteristic of a faded communications channel, equalized in accordance with the principles of this invention, for various fading frequencies.

The equalized, faded channel is shown in FIG. 1 for different positions of the fade minimum. The AGC gain and the amplitude of the two bumps were determined by zero-forcing at three points in the band. These points are determined by pilot tones which are located near each edge and near the center of the band. Therefore, as might be expected, fades with a minimum near either an edge or the center of the band are well equalized, whereas fades which have a minimum equidistant from the pilots are not as well equalized. In fact, fades with a minimum in the 65 MHz or 75 MHz region are not equalized within the ±2 dB requirement previously established. Thus, while the major portion of the amplitude distortion caused by the test fade is equalized by the instant equalizer, additional equalization at the terminal may be needed to meet system requirements.

Figure 2:
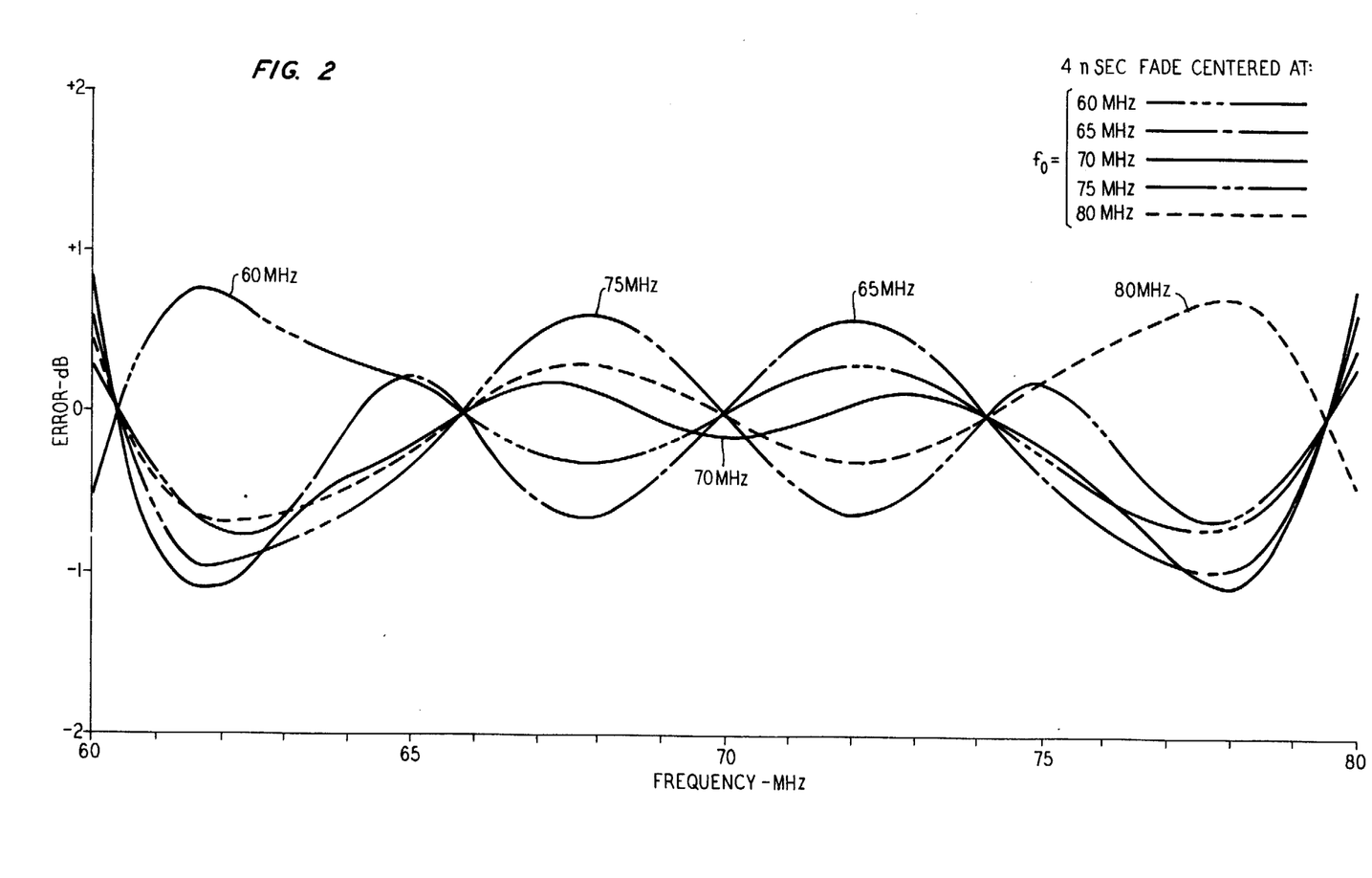
FIG. 2 is a graph showing the transmission characteristics of the communications channel shown in FIG. 1 after additional mop-up equalization has been performed in accordance with the principles of this invention.

As shown in FIG. 1 the resultant error following equalization of fades with varying minima becomes excessive only in the 65 MHz and 75 MHz regions; i.e., approximately equidistant from the zero-forcing pilots at the center and edges of the 20 MHz IF band. In addition, this excessive error is in the form of a smooth, bump-like curve. This suggests the use of a mop-up equalizer consisting of two, somewhat narrower, Bode-type bump equalizers centered midway between the two pilot frequencies of the basic equalizer. Mop-up pilot frequencies near 65 MHz and 75 MHz are used in the illustrative embodiment as zero-forcing frequencies. Since bump equalizers with this degree of sharpness are available, the mop-up equalizer can successfully be used to equalize the residual error of the basic equalizer. The results of combining the basic equalizer with a mop-up equalizer are shown in FIG. 2 and, as can be seen, the final errors are within approximately ±1 dB.

Figure 3:
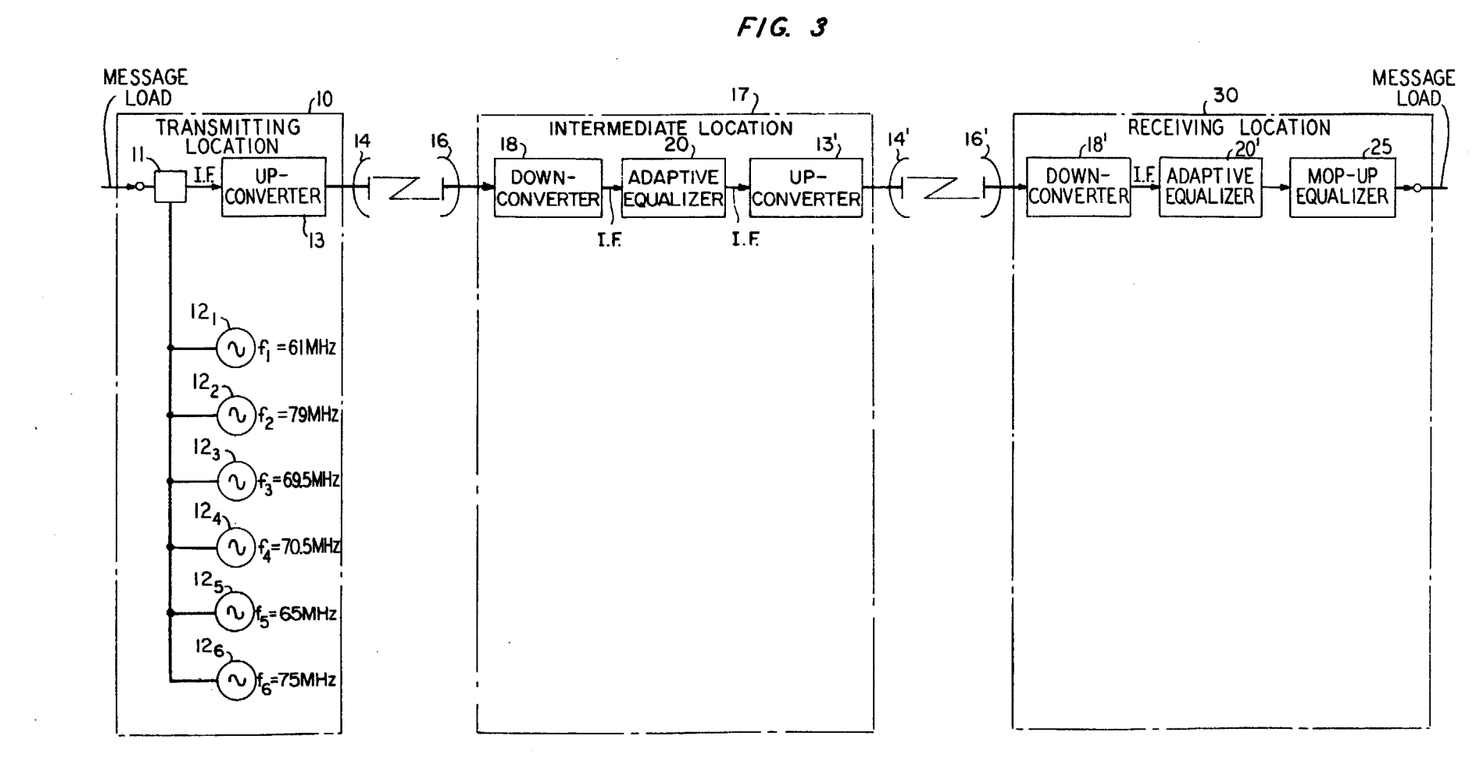
FIG. 3 is a block schematic diagram of an illustrative microwave radio system which is useful in explaining the principles of the invention.

FIG. 3 depicts a simple, one-hop microwave link useful in explaining the instant invention. As shown, transmitting location 10 receives the incoming message load which, in the illustrative example, comprises a suppressed-carrier, amplitude-modulated, single-sideband signal having a bandwidth of 20 MHz centered about the 70 MHz, IF frequency customarily employed with a conventional frequency modulation system. That is to say, the message load to be transmitted over the microwave link extends from approximately 60 MHz to approximately 80 MHz.

A resistive bridge 11, or the like, combines the incoming message load with four, low-level pilot tones which are generated by four tone oscillators $12_1 - 12_4$, respectively. The combined signal is translated in frequency up to 6 GHz in up-converter 13, then transmitted, via microwave antenna 14, to a corresponding antenna 16 at the receiving location 17. A down-converter 18 connected to antenna 16 translates the incoming signal back to the IF frequency of 70 MHz. The output of converter 18 is next applied to the input of an adaptive equalizer 20 which, as will be explained below, acts to maintain a uniform signal amplitude across the 20 MHz bandwidth of the IF band, even in the presence of deep, frequency-selective fading in the microwave link 15.

As previously noted, the output of pilot generator $12_1, f_1 = 61$ MHz, is close to the lower edge of the 60 – 80 MHz single-sideband signal, while the output of generator $12_4, f_4 = 79$ MHz, is close to the upper edge of the band. In like fashion, the outputs of generators $12_2$ and $12_3, f_2 = 69.5$ MHz; $f_3 = 70.5$ MHz, respectively, are symmetrical about the midband IF frequency of 70 MHz.

In FIG. 3, equalizer 20 represents what has previously been referred to as a basic equalizer because, for simplicity, only one hop has been shown in the microwave system. A practical system, however, would have several intermediate microwave repeaters, each of which would have a basic equalizer and several of which would have, in addition, a mop-up equalizer. In this latter event, additional pilot generators would be needed to add the 65 MHz and 75 MHz mid-band pilot tones required by the mop-up equalizer.

Figure 4:
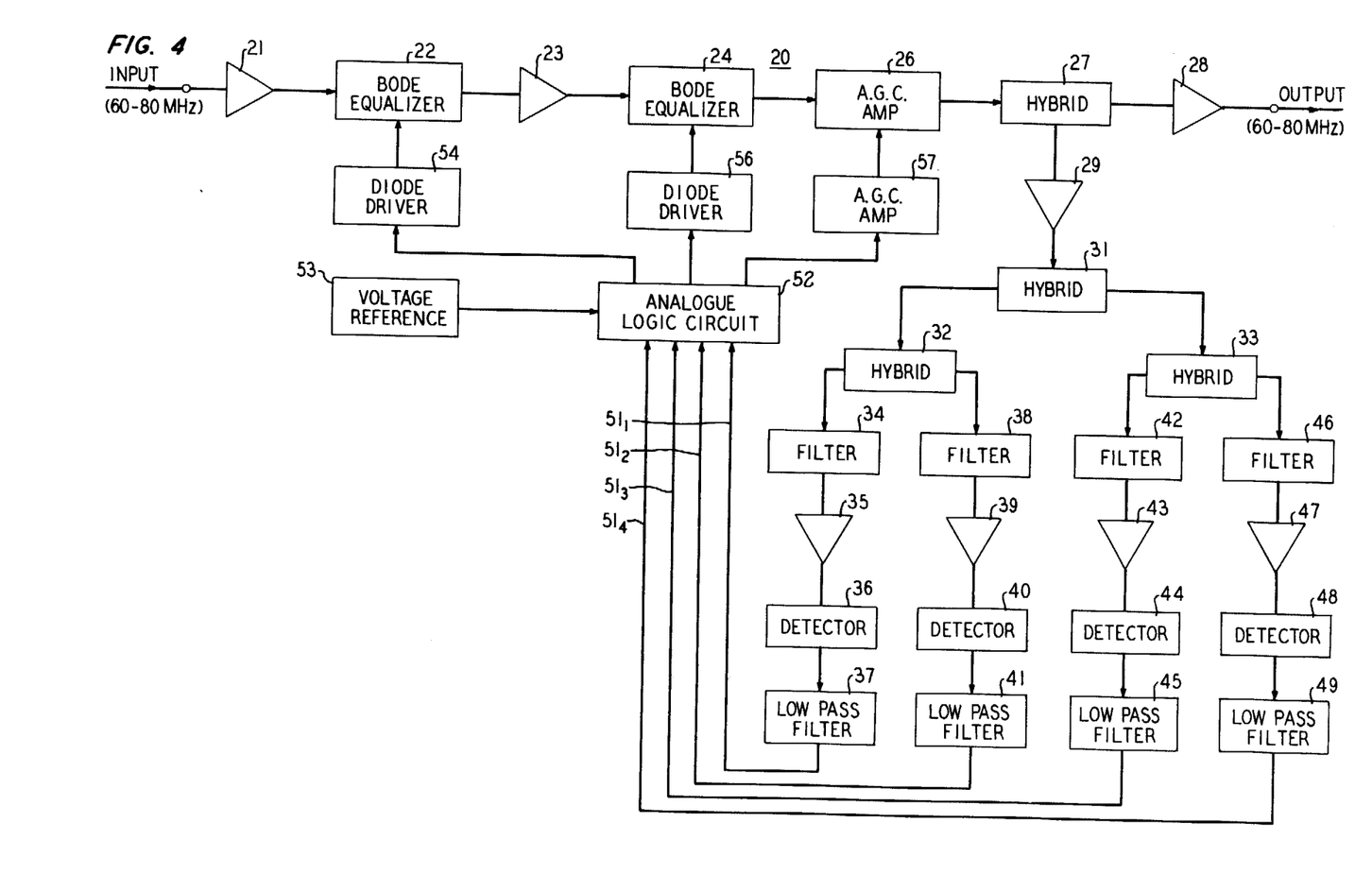
FIG. 4 is a block schematic diagram of an illustrative adaptive equalizer according to the invention.

FIG. 4 depicts equalizer 20 in more detail. As shown, equalizer 20 comprises a flat-gain amplifier 21 having its output connected to a Bode-type equalizer section 22. The output of equalizer section 22 is connected to the input of a second flat-gain amplifier 23, thence to a second Bode-type equalizer section 24. The output of equalizer section 24 is connected to the input of an AGC amplifier 26, the output of which is connected to the input of a hybrid circuit 27. Hybrid 27 has two outputs, one of which is connected to the input of a buffer-amplifier 28 and the other of which is connected, via an amplifier 29 to the input of a second hybrid circuit 31. The two outputs of hybrid circuit 31 are respectively connected to the inputs of a third and fourth hybrid circuit 32 and 33. One output of hybrid circuit 32 is connected to a bandpass filter 34, thence, via an amplifier 35, to the input of a detector circuit 36 and a low-pass filter 37. In like manner, the other output of hybrid circuit 32 is connected to a bandpass filter 38, an amplifier 39, a detector circuit 40, and a low-pass filter 41. The first output of hybrid circuit 33 is similarly connected to a bandpass filter 42, an amplifier 43, a detector circuit 44 and a low-pass filter 45. The other output of hybrid circuit 33 is likewise connected to a bandpass filter 46, an amplifier 47, a detector 48 and a low-pass filter 49. The outputs of low-pass filters 37, 41, 45 and 49 are connected, via leads 51-1 through 51-4, respectively, to the input of an analogue logic circuit 52. A voltage reference source 53 supplies a reference potential to analogue circuit 52, the output of which is connected to the input of a diode driver circuit 54 for equalizer section 22, a diode driver circuit 56 for equalizer section 24, and an AGC driver circuit 57 for AGC amplifier 26.

It is thus seen that equalizer 20 comprises an AGC unit and a shaping unit, the shaping unit itself comprising two Bode-type bump equalizer sections and two flat-gain amplifiers. According to the invention, both the AGC unit and the equalizer sections are varied dynamically, in a continuous fashion, the equalize the fading channel. As previously mentioned, we have discovered that the preferred equalization strategy is to approximate second-order polynomial correction by the use of a zero-forcing technique and, in the illustrative embodiment, this is accomplished by determining the error at three points in the channel and using this error signal to adjust the equalizer to drive these errors to zero. The error is determined by selecting a given pilot tone off the channel, detecting it, and then comparing its detected level with the voltage from reference source 53. This is done for each of the pilots by the corresponding bandpass filter and detector circuit which thus develop an error signal which is fed back to the analogue logic circuit to vary the appropriate equalizer section or sections, as will be more fully explained below.

Figure 5:
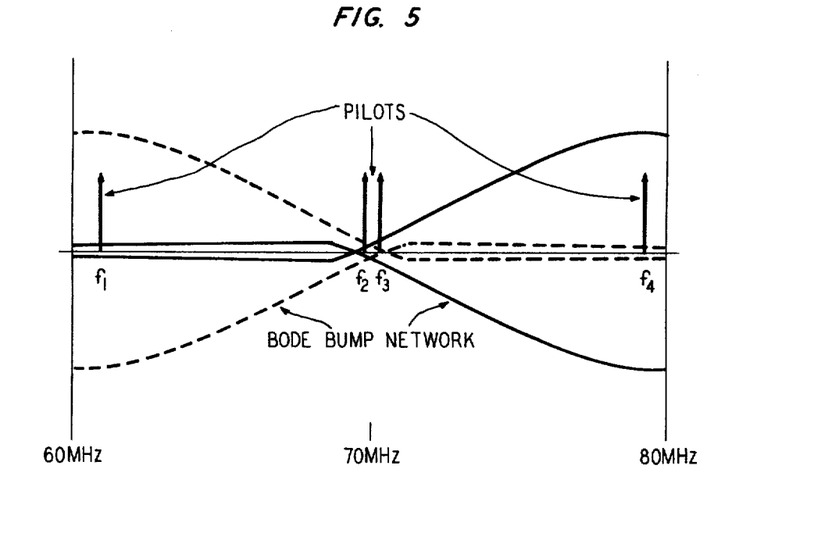
FIG. 5 is a graph depicting the attenuation-versus-frequency characteristic of the equalizer section employed in the equalizer shown in FIG. 4.

Referring now to FIG. 5, it will be seen that in the illustrative embodiment four pilot tones are inserted into the message band. Two pilot tones, ($f_1$, $f_4$), positioned near the edges of the message band, are used to control the two Bode-bump networks. The two additional pilots, ($f_2$, $f_3$), positioned close to, and symmetrical with, the center of the band, are averaged to control the gain of the AGC amplifier. Obviously, if desired, a single pilot tone at the center frequency could be substituted for the two midband pilot tones used in the illustrative embodiment, in which event one of the tone os ators in FIG. 3 and one of the filter-detector branches in FIG. 4 could be eliminated.

FIG. 5 illustrates what is perhaps the most important departure of the present invention from the prior art; that is, the fact that the characteristics of the two Bode-type equalizers are selected such that they do not overlap in frequency to any significant extent. This differs significantly from the prior art approach wherein the characteristics of a multi-bump equalizer are always selected such that the characteristics overlap to a considerable extent, so that overall characteristic is flat over the band of interest.

The filters 34, 38, 42 and 46, which are advantageously crystal filters, have a large effect on the dynamics of the equalizer because their phase characteristics are the major cause of delay in each feedback loop. To maintain stability, it is necessary to associate a low-pass filter with each of the detectors to roll-off the gain characteristic so that the loop gain in each feedback loop reaches zero before the loop phase reaches 180°. The bandwidth of this low-pass filter determines the speed of response of the feedback system. In order to increase the response time of the equalizer, the passband of the lowpass filters must be increased and, if stability is to be maintained, the bandpass filters must also have a wider passband. In other words, to maximize the response time of the equalizer the passband of each bandpass filter must be as wide as possible. Other factors which indicate the desirability of a relatively wide passband for the bandpass filters are the normal temperature effects on the passband and the nominally ±1 kHz accuracy of the pilot tones applied at the transmitting location. However, there are opposing considerations. In the frequency band where the pilot tones are located, ideally a non-message carrying portion of the band, the normal signal-to-noise ratio which is desired is 28 dB for a 3.3 kHz channel. When a 40 dB fade occurs the signal-to-noise ratio will be degraded from 28 dB to only 13 dB. The power in this noise signal will be passed by the bandpass filters and be detected along with the pilots. This, in turn, will cause an error in the determination of the pilot power levels and, thus, in equalizer setting. To limit this error, it is therefore desirable that the passband of the bandpass filters be as narrow as possible. As a compromise between these two extremes, a 3 dB bandwidth of approximately 13 kHz was chosen. The noise present in this slot will cause a maximum 0.02 dB error in level detection in a normal, i.e., unfaded, situation and a 0.8 dB error when a 40 dB fade is present. Dynamic studies have indicated that for this bandwidth a low-pass filter with an 11 kHz cutoff is adequate to maintain stability, yet retaining an adequate response speed. Ideally, the filter passband response should be constant with temperature to within ±0.05 dB over the nominal ±1 kHz range of the pilot tone. The stop band discrimination objectives are also controlled by the presence of interfering signals. Bandpass filters 34, 38, 42 and 46 have to have good discrimination because of the low level of the pilot tone as compared to total channel power. For example, in a typical situation the total channel power at the input to any of the crystal filters is −6 dBm, while the level of an individual pilot tone is −38 dBm, which is, of course, some 32 dB lower. A very narrow discrimination bandwidth filter is required because of the proximity of the message band to the single-frequency pilot tones, which may be as close as 0.068 percent in some cases. For this reason, a 60 dB discrimination bandwidth of approximately 0.13 percent was chosen as an objective for these filters. This reduces the error of the tone level due to the interfering power channel to 0.04 dB.

Each of the circuit elements shown in FIG. 4 is, per se, entirely conventional. For example, the crystal bandpass filters and low-pass filters shown may be those disclosed in Sections 8:41-50 and 8:1-16, respectively, of *Reference Data for Radio Engineers*, Fifth Edition, H. W. Sams, Inc., New York, New York. The voltage reference source and analogue logic circuit may be essentially similar to those shown in FIGS. 5 and 6 of U. S. Pat. No. 2,719,270 to Ketchledge, while the amplifiers, diode drivers, and AGC driver may comprise any suitable amplifier capable of yielding the desired gain.

In theory, the dynamic range of a Bode-type equalizer network is twice the flat loss level of the equalizer. To achieve this range, the termination of the network must be able to assume all values between zero and infinity. In practice, it is only possible to realize a portion of this dynamic range, primarily because parasitic reactances in the terminating element dominate when the element is adjusted for either very small or very large resistance values.

Therefore, in order to realize ±10 dB of shaping for each end of the channel, networks with 15 dB flat loss are required. However, networks with losses this high degrade the noise performance of the system. In addition, high loss networks suffer more from parasitic capacitances. As a compromise, a flat loss of 7.5 dB with ±5 dB of shaping per equalizer network was chosen. Thus, in order to realize a dynamic range of ±10 dB, 4 separate 7.5 dB networks would be required. Calculations performed on this equalizer configuration indicate that for all flat loss levels the total system gain is zero. However, for 7.5 dB of loss, the noise and loss requirements cannot be met simultaneously. Furthermore, any attempt to improve the noise figure degrades $M_{A+B-C}$ and vice versa.

This problem may, however, be solved by providing only ±5 dB of shaping at each microwave repeater. The remaining misalignment is then corrected by the equalizer at the next repeater. With this configuration, only two 7.5 dB networks are required at each repeater.

Also, no output buffer amplifier is used since it is necessary to decrease the intermodulation noise margin in order to lower the overall noise figure. The terminal equalizer will, of course, be equipped with four ±7.5 dB networks.

With this approach, it is important that misalignment between successive repeaters does not degrade the overall noise performance of the system. Investigations have revealed that since the total system noise increases substantially during a fade, the added noise due to the rather moderate misalignment, 8 dB or less, is insignificant. Therefore, this approach seems an attractive solution to the problem.

Figure 6:
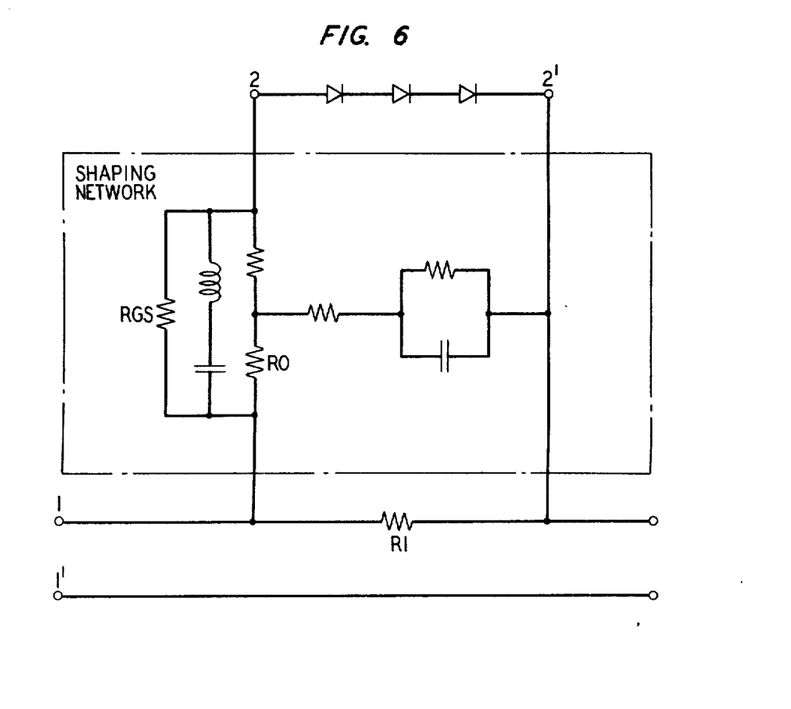
FIG. 6 is a schematic diagram of an illustrative Bode-type equalizer network suitable for use in the adaptive equalizer shown in FIG. 4.

FIG. 6 depicts the configuration of a typical Bode-type equalizer network of a type that may successfully be employed in the equalizer shown in FIG. 2. Each such equalizer network is controlled by an electronically variable resistance element. Several different control elements are suitable for use in this frequency range, including FET's, PIN diodes and thermistors. Thermistors do not respond rapidly enough to track selective fading activity and because PIN diodes have been used successfully in the past at very high frequencies they are preferred for use in the equalizer disclosed herein.

Because the non-linear element is separated from the signal source and the load by a frequency-selective network, the intermodulation noise will not be constant with frequency. The insertion loss from nodes 1—1' to 2—2' of the shaping network is readily computed and the intermodulation noise, as a function of frequency, can be measured using the conventional noise loading technique. The use of three diodes in series rather than a single diode allows a greater bias current to achieve the same insertion loss. This improves the linearity of the equalizer. Further improvement may be realized by shunting the diodes with an additional resistor equal to the largest value required to terminate the network.

Measurements made on the equalizer network shown in FIG. 6 indicate that the change in insertion loss is relative to the flat loss level of 7.5 dB and that the intermodulation noise, $M_{A+B-C}$, can be made less than —90 dB.

Measured noise parameters for each component of the system are summarized in the table below:

| COMPONENT | SYSTEM OUTPUT LEVEL | NOISE FIGURE | | | $M_{A+B-C}$ |
|---|---|---|---|---|---|
| | | 60 MHz | 70 MHz | 80 MHz | |
| First Amplifier | 0 dBm | 6.88 | 6.93 | 7.19 | —83.3 |
| (5 dB Gain) | —6 dBm | — | — | — | —84.0 |
| Second Amplifier | 0 dBm | 8.12 | 8.43 | 8.93 | —80.6 |
| (10 dB Gain) | —6 dBm | — | — | — | —81.5 |
| Equalizer A | 0 dBm | Not Measured | | | —101 |
| (Worst Case) | —6 dBm | Not Measured | | | —101 |
| Equalizer B | 0 dBm | Not Measured | | | —98 |
| (Worst Case) | —6 dBm | Not Measured | | | —98 |

The corresponding measured and computed equalizer system noise parameters are given below.

| SYSTEM OUTPUT LEVEL | NOISE FIGURE | | | | | | $M_{A+B-C}$ comp² | meas. |
|---|---|---|---|---|---|---|---|---|
| | COMPUTED | | | MEASURED | | | | |
| | 60 | 70 (MHz) | 80 | 60 | 70 (MHz) | 80 | | |
| 0 dBm | 12.3 | 12.5 | 12.9 | 12.2 | 12.2 | 12.6 | —62.4 | —62.4 |
| —6 dBm | | | | | | | —63.2 | —62.5 |

Note that the $M_{A+B-C}$ term falls slightly beyond the required —63 dB. The dominant term of this product is the $M_{A+B-C}$ of the amplifiers employed which, in the experimental equalizer actually built and tested, did not meet the required —85 dB level. Recently, amplifiers meeting this requirement have become available, thus the required —63 dB of intermodulation noise can now be met.

Summarizing, we have discovered that selective fading of a microwave channel can be equalized to meet projected system outage statistics by the use of a second-order, polynomial equalizer having up to 42 dB of flat gain, ±15 dB of slope shaping and ±10 dB of quadratic shaping. This equalizer is realized by the combination of a variable gain AGC amplifier and two bump networks. The stringent noise requirements can be met by providing bump networks with only ±5 dB of dynamic range in each equalizer. This corresponds to ±10 dB of slope shaping and ±5 dB of quadratic shaping. Additional dynamic range must then be provided by the equalizer in the next repeater.

It must again be emphasized that while the invention has been disclosed with reference to a particular communications system, it is not so limited and the frequencies and equalizer characteristics given in the illustrative embodiment are tailored to the frequencies employed in that communications system. Obviously, for use in other systems operating with different frequencies, adjustments would be made in the frequencies of the pilot tones and the characteristics of the equalizer networks. Further, one skilled in the art could make various changes and substitutions to the layout of components shown without departing from the spirit and scope of the invention.

What is claimed is:

1. Apparatus for adaptively equalizing the amplitude of a communications channel, said channel having impressed thereon a message load of predetermined bandwidth, first and second pilot tones respectively positioned proximate the upper and lower edges of said band, and at least a third pilot tone positioned proximate the center of said band, said apparatus comprising, in tandem:

means for shaping the frequency characteristic of a first portion of said band;

means for shaping the frequency characteristic of a second portion of said band, said first and second portion shaping means having substantially no shaping effect on that portion of the band shaped by the other; and a variable-gain amplifier connected downstream of said first and second portion shaping means, said apparatus further comprising:

means, connected to the output of said amplifier, for filtering said first, second and third pilot tones from said message load;

means, connected to the output of said filtering means, for detecting said first, second and third pilot tones;

a source of a reference potential; and means, connected to said reference source and to said detecting means, for selectively adjusting the gain of said variable gain amplifier and/or the slope characteristic of said first and second portion shaping means, in an offsetting manner, as the levels of said first, second and third tones vary, whereby the overall amplitude characteristic of said communications channel remains substantially flat even in the presence of frequency-selective and non-frequency-selective fading in said channel.

2. Apparatus according to claim 1 wherein said filtering means comprises, for each pilot tone:
  a. a bandpass filter having its passband centered about the corresponding pilot frequency, and
  b. a flat-gain amplifier; and said detecting means comprises, for each pilot tone:
    1. an RF detector tuned to the frequency of the corresponding pilot tone; and
    2. a low-pass filter having a cutoff frequency such that the gain around the feedback loop tends to zero before the loop phase reaches 180°.

3. The apparatus according to claim 1 wherein said first portion shaping means comprises:
  a first frequency-selective, Bode-type shaping network having its maximum/minimum "bump" amplitude at the frequency of said first pilot tone; and
  a variable-resistance control element connected across said first shaping network to alter the frequency characteristic thereof, said second portion shaping means comprising:
  a second frequency-selective, Bode-type shaping network having its maximum/minimum "bump" amplitude at the frequency of said second pilot tone; and
  a variable-resistance control element connected across said second shaping network to alter the frequency characteristic thereof, said selective adjusting means including means for altering the resistance of the control element associated with each of said first and second shaping networks.

4. The apparatus according to claim 3 wherein:
  a. each of said control elements comprises at least one semiconductor diode; and
  b. each of said resistance altering means comprises a driver circuit for supplying a selectively variable d.c. current to said at least one diode.

5. Apparatus for adaptively equalizing the amplitude of a communications channel, said channel having impressed thereon a message load of predetermined bandwidth, first, second and third pilot tones respectively positioned proximate the upper and lower edges and the center of said band, and fourth and fifth pilot tones respectively positioned approximately midway between said first and said third and said third and said second pilot tones, said apparatus comprising, in tandem:

means for shaping the frequency characteristic of a third portion of said band;

means for shaping the frequency characteristic of a fourth portion of said band, said third and fourth portion shaping means each having substantially no shaping effect on that portion of the band shaped by the other; and a variable-gain amplifier connected downstream of said third and fourth portion shaping means, said apparatus further comprising:

means, connected to the output of said amplifier for filtering said third, fourth and fifth pilot tones from said message load;

means, connected to the output of said filtering means, for detecting said third, fourth and fifth pilot tones;

a source of a reference potential; and means, connected to said reference source potential and to said detecting means for selectively adjusting the gain of said variable-gain amplifier and/or the slope characteristic of said third and fourth portion shaping means, in an offsetting manner, as the levels of said third, fourth and fifth pilot tones vary, whereby the overall amplitude characteristic of said communications channel remains substantially flat.

6. Apparatus according to claim 5 wherein said filtering means comprises, for each pilot tone:
  a. a bandpass filter having its passband centered about the corresponding pilot frequency; and
  b. a flat-gain amplifier and said detecting means comprises, for each pilot tone:
    1. an RF detector tuned to the frequency of the corresponding pilot tone; and
    2. a low-pass filter having a cutoff frequency such that the gain around the feedback loop tends to zero before the loop phase reaches 180°.

7. The apparatus according to claim 5 wherein said third portion shaping means comprises:
  a third frequency-selective, Bode-type shaping network having its maximum/minimum "bump" amplitude at the frequency of said fourth pilot tone; and
  a variable-resistance control element connected across said third shaping network to alter the frequency characteristic thereof, said fourth portion shaping means comprising:
  a fourth frequency-selective, Bode-type shaping network having its maximum/minimum "bump" amplitude at the frequency of said fifth pilot tone; and
  a variable-resistance control element connected across said shaping network to alter the frequency characteristic thereof, said selective adjusting means including means for altering the resistance of the control elements associated with each of said shaping networks.

8. The apparatus according to claim 7 wherein:
   a. each of said control elements comprises at least one semiconductor diode; and
   b. each of said resistance altering means comprises a driver circuit for supplying a selectively variable d.c. current to said at least one diode.

9. In a communications system of the type that includes a plurality of concatenated communications links requiring dynamic equalization:
   means for transmitting an amplitude-modulated signal over said links with a channel frequency and bandwidth such that the said bandwidth is a minor portion of the lowest frequency in said band;
   means coupling said links for repeating said signal with a prescribed amplitude-versus-frequency characteristic;
   means for applying first, second, third, fourth and fifth pilot tones to the amplitude-modulated signal, said first, second and third pilot tones being respectively positioned near the upper and lower edges and the center of said band and said fourth and fifth pilot tones being respectively positioned approximately midway between said first and third and said third and second pilot tones, the improvement which comprises:
   a plurality of first equalizing means associated with selected ones of said repeating means; and
   a plurality of second equalizing means associated with selected other ones of said repeating means, each first equalizing means comprising:
   means for providing at least two, variable, amplitude-versus-frequency "bumps" in the transmission path of said signal, said bumps occurring in different upper and lower portions of the band and being substantially non-overlapping in effect;
   means for providing automatic gain control across said band;
   means for separately detecting said first, second and third pilot tones;
   feedback means, responsive to the three detected pilot tones, for varying the shape of said "bumps" and/or the gain of said automatic gain control means, in an offsetting manner, as the level of said amplitude-modulated signal varies, each of said second equalizing means comprising:
   means for providing at least two, variable, amplitude-versus-frequency "bumps" in the transmission path of said signal, said "bumps" occurring in different upper and lower portions of the band and being narrower than the "bumps" provided in the transmission path by the corresponding means in each of said first equalizing means, and being substantially non-overlapping in effect;
   means for providing automatic gain control across the band;
   means for separately detecting said third, fourth and fifth pilot tones; and
   feedback means, responsive to the three detected pilot tones, for varying the shape of said "bumps" and/or the gain of said automatic gain control means, in an offsetting manner, as the amplitude of said amplitude-modulating signal varies across the band.

10. A method of adaptively amplitude equalizing a communications channel carrying a message load of predetermined bandwidth, comprising the steps of:
    at a transmitting location, adding to said message load, first, second and third pilot tones respectively positioned near the upper and lower edges and the middle of said band:
    at a receiving location, filtering said pilot tones from said message load;
    detecting said pilot tones thereby to generate first, second and third control signals;
    shaping a first portion of said message load in a shaping network having an attenuation-versus-frequency characteristic centered about the frequency of said first pilot and adjustable slope;
    shaping a second portion of said message load in a shaping network having an attenuation-versus-frequency characteristic centered about the frequency of said second pilot and adjustable slope, there being substantially no frequency overlap between said first and second band portions;
    amplifying said shaped message load in an automatic gain control amplifier;
    comparing said first, second and third control signals with a reference potential; and then
    adjusting the slope of said shaping networks and/or the gain of said AGC amplifier in accordance with the results of said comparison step, thereby to maintain a uniform level across said message band.

11. The method according to claim 10 including the further steps of:
    adding to said message load fourth and fifth pilot tones respectively positioned approximately midway between said first and third, and third and second pilot tones:
    at a further receiving location, filtering said third, fourth and fifth pilot tones from said message load;
    detecting said third, fourth and fifth pilot tones thereby to generate third, fourth and fifth control signals;
    shaping a third portion of said message load in a shaping network having an attenuation-versus-frequency characteristic centered about the frequency of said fourth pilot and adjustable slope, said third portion of the message load being contained within, and of lesser bandwidth than, said first portion;
    shaping a fourth portion of said message load in a shaping network having an attenuation-versus-frequency characteristic centered about the frequency of said fifth pilot and adjustable slope, said fourth portion of the message load being contained within, and of lesser bandwidth than, said second portion;
    amplifying said shaped message load in an automatic gain control amplifier;
    comparing said first, second and third control signal with a reference potential; and then
    adjusting the slope of said shaping networks and/or the gain of said AGC amplifier in accordance with the results of said comparison step, thereby to maintain a uniform level across said message band.

* * * * *